United States Patent
King

(10) Patent No.: US 6,798,670 B2
(45) Date of Patent: Sep. 28, 2004

(54) DC-DC CONVERTER

(75) Inventor: Ray King, Carolina Beach, NC (US)

(73) Assignee: International Rectifier Corporation, El Segundo, CA (US)

( * ) Notice: Subject to any disclaimer, the term of this patent is extended or adjusted under 35 U.S.C. 154(b) by 291 days.

(21) Appl. No.: 10/115,610

(22) Filed: Apr. 2, 2002

(65) Prior Publication Data

US 2004/0071004 A1 Apr. 15, 2004

Related U.S. Application Data

(60) Provisional application No. 60/280,117, filed on Apr. 2, 2001, and provisional application No. 60/281,717, filed on Apr. 6, 2001.

(51) Int. Cl.[7] .............................................. H02M 3/335
(52) U.S. Cl. ........................................ 363/17; 363/26
(58) Field of Search .............................. 363/17, 24, 25, 363/26; 307/10.1, 20, 24, 76, 10.7

(56) References Cited

U.S. PATENT DOCUMENTS

| | | | | |
|---|---|---|---|---|
| 5,175,439 A | * | 12/1992 | Harer et al. | 307/10.1 |
| 5,998,976 A | * | 12/1999 | Steffan | 322/10 |
| 6,205,035 B1 | * | 3/2001 | Vollmer et al. | 363/17 |
| 6,314,006 B1 | * | 11/2001 | Berberich et al. | 363/25 |

* cited by examiner

*Primary Examiner*—Adolf Berhane
(74) *Attorney, Agent, or Firm*—Ostrolenk, Faber, Gerb & Soffen, LLP

(57) ABSTRACT

A DC/DC converter interconnecting a first DC voltage source having a first potential and a second DC voltage source having a second potential and having a stepup/stepdown transformer coupled between the two voltage sources; a controlled switching circuit coupled to the transformer for switching pulsed direct current through the transformer between the voltage sources; and a controller controlling a switching operation of the switching circuit to allow the pulsed direct current to flow between the two voltage sources, whereby current flows between the two voltage sources in dependence on load demands imposed on respective ones of the two voltage sources.

18 Claims, 3 Drawing Sheets

FIG. 4
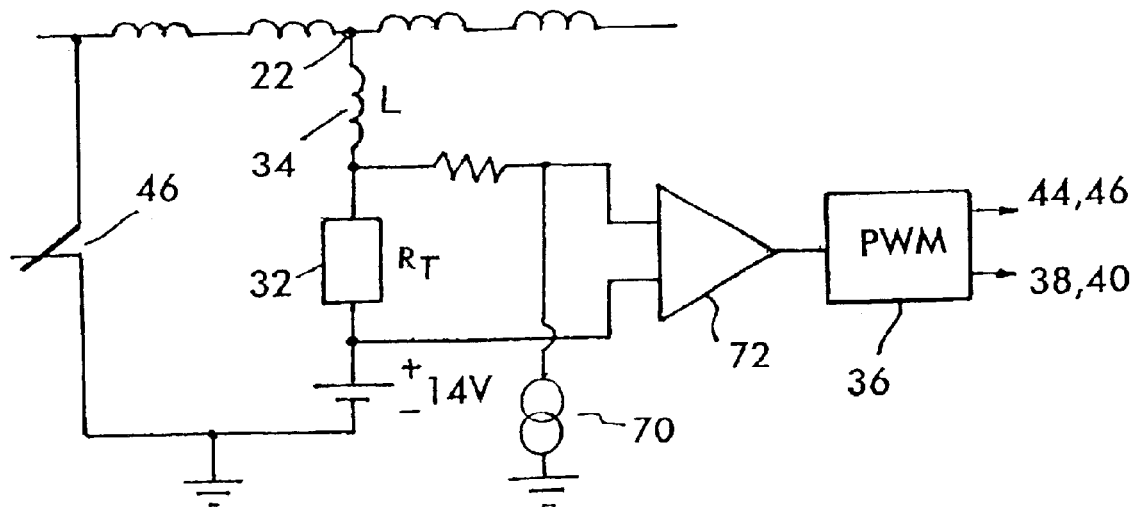
FIG. 5A
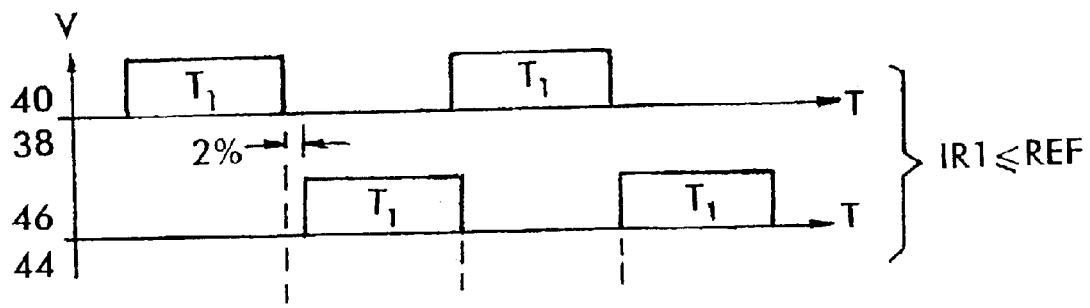
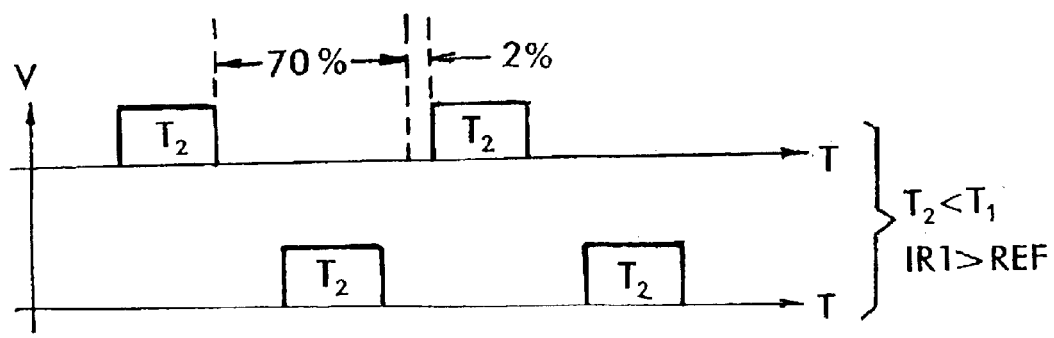
FIG. 5B

DC-DC CONVERTER

CROSS-REFERENCE TO RELATED APPLICATION

This application is based on and claims priority to U.S. Provisional Patent Application Nos. 60/280,117, filed Apr. 2, 2001 and 60/281,717 filed Apr. 6, 2001 both entitled 14VOLT TO 42 VOLT BIDIRECTIONAL AUTOMOTIVE CONVERTER, the entire disclosures of which are hereby incorporated by reference.

FIELD OF THE INVENTION

The invention relates to a DC to DC converter. More particularly, the invention relates to a DC/DC converter usable in bidirectional energy transfers to interconnect two different DC voltage sources and networks. More particularly, the invention relates to a DC—DC converter that can be used in automobiles having a 42 volt system or a dual 42v/14v system. The invention allows interfacing between 14v and 42v systems. For example, the invention can allow 14v systems and 42v systems to supply each other, as needed. The invention would also be used to allow a 14v system to charge or jump start a 42 volt system, or vice versa.

BACKGROUND OF THE INVENTION

It is known to have two DC voltage networks coexistent and cooperating within a single system. For example, it is expected that automobiles may be provided with a 14 volt network for driving a first set of loads and a 42V network for powering further loads. It is sometimes necessary to provide added energy to the 12 volt or 42 volt system. In that case the system must be separately charged; or must be sufficiently large that it can supply any excess demand.

It would be desirable to provide a single DC/DC converter which allows two different DC voltage networks to be interconnected in an efficient and simple manner and which allows bi-directional energy transfer between the networks and associated loads.

It is also desirable to provide a converter which allows a 14v system to charge or jump start a 42v system and vice versa.

Further, it is desirable to provide a converter which minimizes load dumps, i.e., minimizes the storage and release of voltage spikes from for example, the vehicle alternator or other sources.

BRIEF SUMMARY OF THE INVENTION

In accordance with the invention, a DC/DC bidirectional converter is provided, including a transformer and two pairs of alternatively operating semiconductor switches for transferring electrical energy between two-sources of energy of different voltages, e.g. 12 volts and 42 volts, and their loads. The novel circuit allows either of two different power sources to drive the other source and load.

More specifically, the converter may comprise four switches, preferably vertical conduction MOSFETs, in a modified H bridge type configuration. A multi-turn auto transformer is connected to the bridge. The center of the transformer winding is connected to one of the voltage sources of the system. Two taps between the center and ends of the windings are connected to respective low side MOSFETs while the high side MOSFETs are connected between respective winding ends and the second voltage source. Diagonally disposed switches are then simultaneously and alternately turned on and off, with an approximate 50% duty cycle, with energy being transferred between the two networks by the transformer action of the auto transformer.

The converter of the present invention has no voltage control of its own but operates as a true dc-to-dc bi-directional converter of whatever voltage the automotive alternator dictates. The alternator's output can be located on the 14-volt bus or on the 42-volt bus. Preferably, the alternator will supply the 42v bus.

The novel converter has a current limiter to protect itself against excessive currents. The current measurement needs only to be on one of the 14v or 42V connections because the current is common to both voltage rails but is of different magnitudes.

The converter of the present invention operates with a square wave and very little dead time. The transformer is wound with a 3:1 turns ratio, connected as an autotransformer connection to minimize components as well as reduce peak currents by ⅓. The 3:1 ratio operates similar to a standard ac transformer with isolated windings and acts as a constant power converter (e.g., if 5 amps are applied to the 42 volt bus and there is no load there, then the load must be on the 14 volt bus, but the current is now (3×5) or 15 amps). The time base can be derived from various dual output pwm controllers such as the SG1525, which also provides a proportional volt second control for each side of the transformer so as to prevent core saturation. The pairs of diagonal MOSFET switches of the bridge switch simultaneously and alternatingly with the other pair. The MOSFETs operate as a switch and as a rectifier at the same time (synchronous rectification). There are no pulsating currents on the input or on the output when operating within the current rating range. During the start-up and if energy is needed in excess of the capability of the converter, it has a current limiting PWM mode of operation. PWM is also used during the start up (soft start is built into the SG1525). An inductor may be used during the PWM period. A resistor may be used to measure current by way of a comparator such as the LM339 and translates to the PWM controller via another switching device. Alternatively, a current transformer can be used. The control circuit is referenced to a virtual earth ground, which is developed by diodes. A capacitor and diodes also form a clamp for the only winding (i.e., the then unconnected winding) needing an energy clamp. The virtual earth ground is approximately 15 volts below the traditional automotive earth ground. This allows the use of four of the isolated gate drivers such as the IR2110. Each of the IR2110's is used to drive one of the gates of the MOSFETs. The dead time needed to insure safe operation is a feature of the SG1525.

When current is flowing into or out of the 42-volt bus, its magnitude is equal in each and alternating in the two high side MOSFETs. When current is going into or out of the 14-volt bus, its magnitude is shared ⅓ in a high side MOSFET, and ⅔ in a low side MOSFET. This is from the transformer action of the autotransformer connection.

To provide a reliable switching operation, in accordance with another aspect of the invention, the DC/DC converter has a control unit. This unit includes a pulse width modulator (PWM) generating a pair of control signals applied to the gates of semiconductor switches in a desired manner, and a set of amplifiers and drivers for converting the generated control signals to required levels.

A further aspect of the invention relates to a current limiting circuit operating to monitor the currents flowing across a current sensor and to limit load currents at a certain safe level to prevent the electronic components and/or the load from structural damage. The same circuit provides a soft start of the converter.

An important feature of the invention is that it minimizes load dump because it does not include, at least in the power conversion circuitry, any energy storage components such as large inductors or capacitors. This helps to reduce the occurrence of load dumps into a vehicle's electronic circuitry due to stored spikes from, e.g., the vehicle alternator or other sources (e.g. jump starts).

Another feature is that the converter provides for current/temperature compensation at one of the networks, e.g., the 42v network, which is automatically replicated at the other network, e.g., the 14v network. Further, in the converter of the invention, there is no interruption of current during operation, minimizing the occurrence of harmful transients.

Other features and advantages of the present invention will become apparent from the following description of the invention which refers to the accompanying drawings.

BRIEF DESCRIPTION OF THE DRAWINGS

FIG. 4 is a simplified functional diagram of the current measuring and limiting circuit of the schematic shown in FIG. 1.

FIGS. 5A, 5B shows normal and critical operating waveforms illustrating an operation of the current measuring and limiting circuit.

DETAILED DESCRIPTION OF EMBODIMENTS OF THE INVENTION

Figure 1:
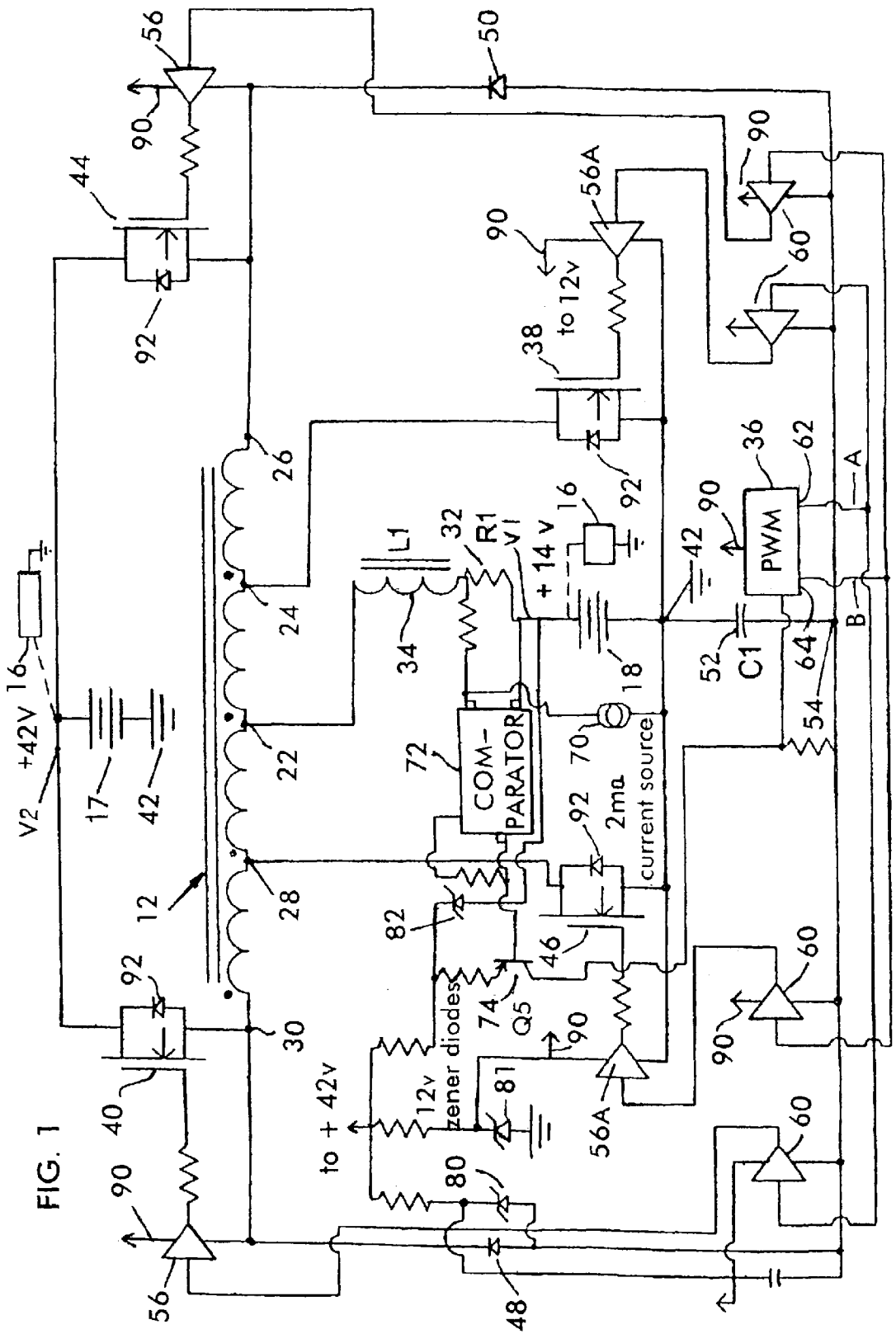
FIG. 1 is a schematic of the converter in accordance with the invention.
Figure 2A:
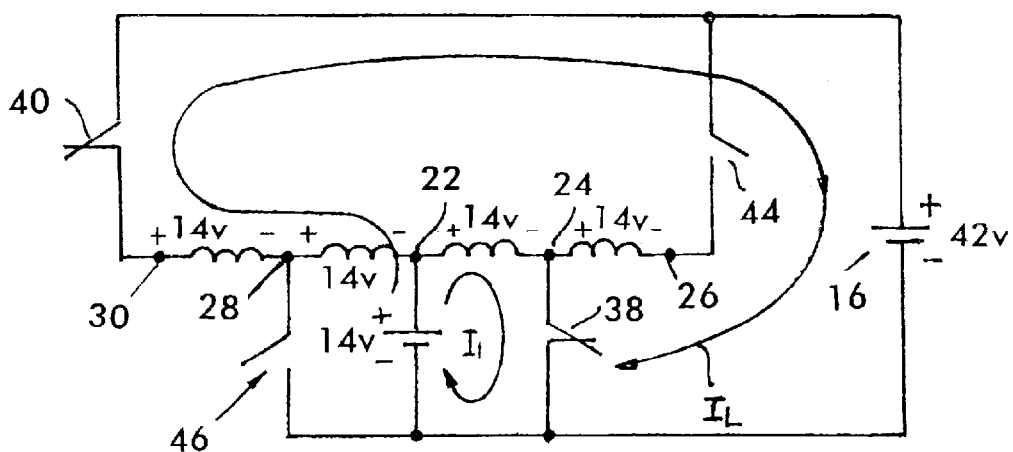
FIG. 2A is a simplified circuit diagram illustrating current flow and voltage distribution during a first half of a control cycle in the core components of the schematic shown in FIG. 1.
Figure 2B:
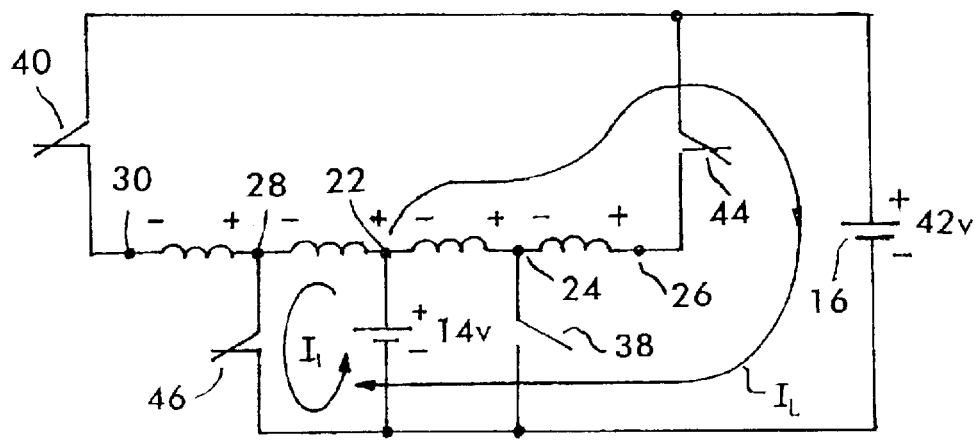
FIG. 2B is a simplified circuit diagram illustrating current flow and voltage distribution during a second half of the control cycle in the core components shown in FIG. 2.
Figure 3:
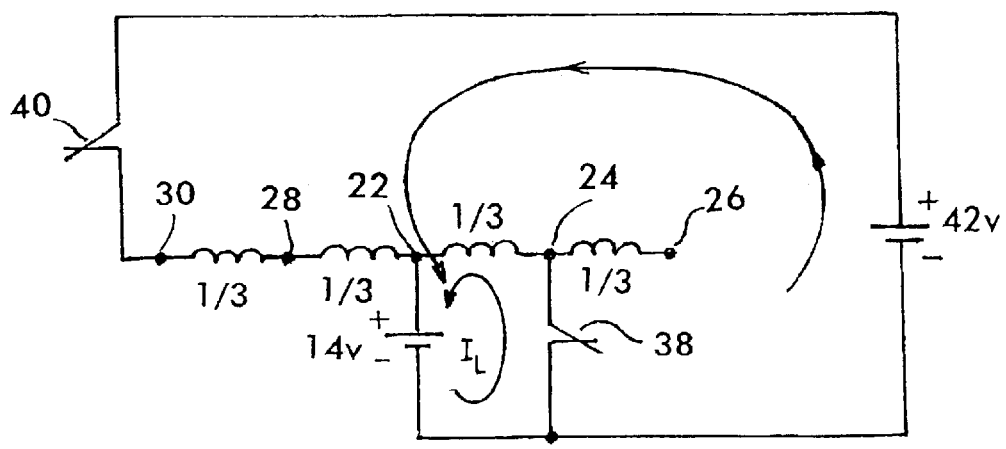
FIG. 3 is a functional diagram analogous to FIG. 2A but showing the distribution of currents and voltages in the downward mode of the converter of FIG. 1.

Referring to FIGS. 1–3, a circuit arrangement for a converter interconnecting two DC voltages V1 and V2, which, in case of a motor vehicle, may correspond to the nominal values of 14V and 42V, respectively, is shown. The current direction and hence the direction of action of the circuit as an upward or downward converter is automatically controlled. As a result, either of two power sources can charge the other power source and/or power both networks. Thus, the inventive converter having no voltage control of its own operates as both a DC/DC upward and downward converter. The alternator's output can be located on the 14V bus or on the 42V bus. Preferably, the alternator is on the 42v bus. Although the disclosed voltages have nominal values 14V and 42V, different nominal values can be easily implemented using the principles of the present invention.

FIG. 1 shows the circuit diagram of the converters. FIGS. 2A–2B to an upward mode of operation of the converter. The converter comprises an autotransformer 12 with a turns ratio of 1:3. An autotransformer is preferably used to minimize components cost and to reduce peak currents by ⅓. Because the windings are connected as an autotransformer, if one winding acts as a primary, and two series connected windings act as the secondary, the voltage will be stepped up 3:1. The autotransformer has 4 series connected windings, each with an equal number of turns. Such a ratio, if implemented in a motor vehicle, allows a 14V source to charge a 42V source (36V battery) and/or drive a load 16 connected to the 42V source and vice versa. Although the circuitry uses an autotransformer, a multiple isolated winding transformer can be used. Although in the diagram, 14 volt and 42 volt sources are shown, it is understood that this is the nominal voltage level. Typically, the 14V source would comprise a 12 volt battery and a charging alternator for a nominal 14V. Similarly, on the 42V side, there is a 36 volt battery and the 42V alternator, for a nominal 42V. The alternator 14V or 42V, respectively, can be located on either side, although it is typically on the 42v guide.

A discussion will first be presented showing how the circuit operates to charge the 42V source battery 17 or power the load 16 using the 14V source battery 18. A positive terminal 20 of the 14V source battery 18 is coupled to a central tap 22 of the transformer 12 through a current sensor 32 (resistor R1) connected in series with an inductor (L1) 34. As a result, as will be explained below, during a first half of a control cycle determined by a PWM controller 36 that turns on a first pair of diagonally disposed switches 38, 40, one of the windings located between taps 22–24 operates as a primary winding. As a result, a current flows along a first circuit including the resistor 32, the inductor 34, the primary winding 22–24 and the sourced-drain path of switch 38.

The electronic switches, as illustrated in the drawings, are preferably MOSFETs. Bipolar devices as well as IGBTs can be used instead of MOSFETs depending on a specific design and its application. MOSFETs are particularly advantageous to use because they allow bidirectional current flow. Since the MOSFETs 38 and 40 are simultaneously conductive, the windings between taps 22–28 and 28–30 operates as a secondary. The tap 30 is coupled to a drain of the MOSFET 40 to define a second current circuit including the 42V battery source which has an automotive earth ground 42 which is also a ground for the 14V battery source. A current induced in the secondary 30–28–22 flows through MOSFET 40 to source 42 and any connected load 16. Current will also flow through the intrinsic body diode 92. The 14 volt source thus supplies power to the 42 volt source, charging battery 17 and supplying power to the connected load 16. In a typical application, 14v source can be connected to the converter to charge a dead 36v battery of a 42v system.

To prevent saturation of the core of the transformer, the control circuit operates so that it turns off the MOSFETs 38, 40, as explained below, and subsequently turns on a second pair of MOSFETs 44, 46 during a second half of the control cycle. As a result, the winding between the taps 28, 22 operates as the primary, whereas the windings located between taps 22–24 and 24–26, the latter of which is coupled with a drain of the MOSFET 44, operates as the secondary. Induced secondary current also flows through the body diode 92 of MOSFET 44. During the second half cycle, the 42 volt source battery is again charged from the 14V source and the load 16 powered.

FIGS. 2A and 2B, which omit components that are not necessary for understanding the principle of the above-disclosed operation, illustrate this operation in a simplified manner. As shown in FIG. 2A, in response to a control signal appearing on an output A of the PWM controller 36 (FIG. 1), the MOSFET switches 38 and 40 are turned on simultaneously, whereas the switches of the other pair 44, 46 are open. The 14V source is coupled in series with a winding 22–24 and with the turned on switch 38 so that the current flow in winding 22–24 generates a magnetic field. The latter induces a corresponding current flow in the secondary windings 22–28 and 28–30 which is applied to the 42V source via switch 40 and its body diode 92. As a result, a stepped-up voltage is applied to the 42V source. Because of the autotransformer connection and the 1:3 turns ratio, the output voltage across the series connection of the battery 18 and windings 22–28 and 28–30 is three times the 14V source level.

In accordance with the operation of the PWM controller 36, the control signal B is output in the second half of the control cycle (FIG. 1) to turn on simultaneously the MOSFETs switches 44 and 46 after the switches 40 and 38 have been turned off. As shown in FIG. 2B, the primary circuit includes a winding 22–28 and closed MOSFET switch 46 connected to ground. An induced current flows through the two secondary windings 22–24 and 24–26 coupled in series with the 14V battery source, closed MOSFET switch 44 (and body diode 92) and the 42 volt source 17. As a consequence, the 14V source charges the 42V source battery and powers the load 16. Because of the 1:3 turns ratio and autotransformer connection, a stepped-up voltage is applied to charge the 42V source battery and power the associated load.

Referring to FIG. 1, if the converter is in its downward mode, both pairs of MOSFET switches are driven exactly as in the case of the upward converter. However, in this case, the direction of current flow is from the 42V source to the 14V source. As a result, as better illustrated in FIG. 3, during the first half period of the control cycle, the MOSFET switches 40 and 38 are closed so that only ⅓ of the 42V source voltage is applied to the 14V source and/or the 14V network of loads. Specifically, the consecutive series connected windings 30–28 and 28–22 operate as the primary, whereas, the winding 22–24 operates as the secondary. Accordingly, a current flows in the secondary circuit $I^L$ through switch 38 (and body diode 92) that is twice the current in the primary circuit. See FIG. 3. Stated differently, current into (or out of) the 14V bus is shared such that ⅓ flows in switch 40 and ⅔ flows in switch 38. This is due to the autotransformer connection and 3:1 turns ratio of the autotransformer connection.

Similarly to the upward mode of operation of the converter, during the second half of the control cycle, the MOSFET switches 46 and 44 are turned on. The pair of switches 40 and 38 have been turned off. Currents flow through MOSFET 44 and MOSFET 46 and its body diode 92. As a result, one third of the 42V source voltage is applied to the 14V source in each half period of the control cycle in the downward mode of the DC/DC converter.

The PWM controller 36 operates so that each pair of the MOSFET switches should be opened before the other two switches are closed. The dead time needed to insure safe operation is a feature of PWM 36. Based on the load demands on each network, it may be necessary to clamp the energy in the only windings needing an energy clamp, i.e., the one winding connected to an open switch, (which can be either winding 28–30 or 24–26 depending on which switches 40, 44 are off), the circuit arrangement includes two diodes 48, 50 and a capacitor 52 connected to a virtual ground 54. This allows capacitor 52 to charge to a voltage level about 15 volts below the automotive ground 42. This provides a negative power supply for the four isolated drives 60 (such as IR-2110) that drive the MOSFET gates.

It should be noted that the MOSFETs operate both as switches and/or rectifiers at the same time and thus perform synchronous rectification.

During start-up, and if energy is needed in excess of the power rating of the converter, it has a current limiting PWM mode of operation. To achieve this, the converter 10 has a current sensor 32 (FIG. 1), for example resistor R1, connected in series with the inductor 34. The inductor 34 is used during PWM operation. PWM is also used during the start-up to provide a soft-start. This soft-start is built into the PWM controller 36, such as an SG 1525.

As shown in FIG. 4, when a voltage across resistor 32 reaches a reference level set by a reference current source 70, the output of comparator 72 goes low turning on transistor 74. This provides a high signal to PWM 36 turning on the PWM so that the converter enters the PWM mode of operation to limit the current. The switches 38, 40 and 44, 46 are then operated in a PWM mode of operation whereby the switch gates are pulse width modulated to limit their on times and thus reduce currents in the switches and currents provided to the loads.

The above disclosed operation is better illustrated by the simplified diagrams of FIGS. 5A and 5B. When the signal across resistor 32 does not exceed the reference value, the duty cycle is 48%. A dead time period between two half-periods is insignificant and does not exceed 2% of the entire duration of the control cycle.

If the measured signal on the resistor 32 exceeds the reference level, the duty cycle is reduced by the controller 36, as shown in FIG. 5B, thus reducing the current through the switches and supplied to the loads.

Alternatively, a current transformer can be used instead of the current sense resistor R1 and comparator 72. The output of the current transformer can be used to initiate the PWM mode of operation to limit the current. Use of a current transformer will also reduce the need for inductor L1. Inductor L1 is generally of small size, so it will not be effective to store large amounts of energy and thus will not contribute to load dumps. Further, use of inductor L1 is optional.

Zener diode 81 is used to provide 12V power to comparator 72. Zener diodes 80 and 82 provide further regulated voltage sources. As shown, drivers 60 are supplied from both the positive and negative supplies. Drivers 56A are supplied from the positive 12 volt supply and drivers 56 are referenced to the points 26 or 30.

In addition, typically, temperature/current compensation will be performed at the 42v side of the system. Because of the 3:1 ratio provided by the autotransformer, such temperature/current compensation will automatically be replicated at the 14v side of the system. Alternatively, the temperature/current composition can be performed at the 14v side and replicated at the 42v side.

Although the invention has been shown interconnecting 14 and 42 volt systems, the invention can be used in a vehicle having only a 42v system (or only a 14v system). In such case, if, for example, the vehicle has a 42v system, the invention will allow charging of the 42v system from a 12v source, or vice versa, to assist in charging a dead battery and jump starting, for example.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A DC-to-DC converter for interconnecting two DC voltage sources comprising a first source having a first potential and a second source having a second potential, the converter allowing current to be drawn from either voltage source by a load connected to either voltage source, the converter comprising:

a transformer coupling the first and second voltage sources and loads connected to each voltage source;

a first controlled switch coupling the transformer and the second voltage source;

a second controlled switch coupling the transformer and the second voltage source;

a third controlled switch coupling the transformer and the first voltage source;

a fourth controlled switch coupling the transformer and the first voltage source;

a controller for repetitively turning on and off the first and fourth controlled switches simultaneously and alternately turning on and off the second and third controlled switches simultaneously; whereby current flows from the first voltage source to the second voltage source or from the second voltage source to the first voltage source depending on power demands placed on the first and second voltage sources;

wherein the transformer has a plurality of windings including:
  a first winding coupling the first controlled switch and the third controlled switch;
  a second winding coupling the second controlled switch and the fourth controlled switch;
  a third winding coupling the first controlled switch and the first source voltage source; and
  a fourth winding coupling the fourth controlled switch and the first voltage source.

2. The converter defined in claim 1, wherein the transformer comprises an autotransformer and the first, second, third and fourth windings are connected in series.

3. The converter defined in claim 2, wherein the first, second, third and fourth windings are connected in series in the order first winding, third winding, fourth winding and second winding.

4. The converter defined in claim 1, wherein the controlled switches are selected from the group consisting of MOSFETs, IGBTs and bipolar devices.

5. The converter defined in claim 1, wherein each of the controlled switches is bridged by a respective diode.

6. The converter defined in claim 1, wherein when the first and fourth controlled switches are turned on, current flows between the first and second voltage sources in at least a portion of a first half cycle determined by the controller, and when the second and third switches are turned on, current flows between the first and second voltage sources in at least a portion of a second half cycle determined by the controller.

7. The converter defined in claim 6, wherein the controller includes a pulse width modulator generating first and second control signals for respectively controlling the first and fourth controlled switches simultaneously and the second and third controlled switches simultaneously, to render each pair of the first and fourth controlled switches and the second and third controlled switches conductive during the respective first and seconds half cycle of the controller.

8. The converter defined in claim 7, further comprising a current limiting circuit for preventing excessive current from flowing between the first and second voltage sources.

9. A DC-to-DC converter for interconnecting two DC voltage sources comprising a first source having a first potential and a second source having a second potential, the converter allowing current to be drawn from either voltage source by a load connected to either voltage source, the converter comprising:

a transformer coupling the first and second voltage sources and loads connected to each voltage source;

a first controlled switch coupling the transformer and the second voltage source a second controlled switch coupling the transformer and the second voltage source;

a third controlled switch coupling the transformer and the first voltage source;

a fourth controlled switch coupling the transformer and the first voltage source;

a controller for repetitively turning on and off the first and fourth controlled switches simultaneously and alternately turning on and off the second and third controlled switches simultaneously; whereby current flows from the first voltage source to the second voltage source or from the second voltage source to the first voltage source depending on vower demands placed on the first and second voltage sources;

wherein when the first and fourth controlled switches are turned on. current flows between the first and second voltage sources in at least a portion of a first half cycle determined by the controller, and when the second and third switches are turned on. current flows between the first and second voltage sources in at least a portion of a second half cycle determined by the controller;

wherein the controller includes a pulse width modulator generating first and second control signals for respectively controlling the first and fourth controlled switches simultaneously and the second and third controlled switches simultaneously, to render each pair of the first and fourth controlled switches and the second and third controlled switches conductive during the respective first and seconds half cycle of the controller;

further comprising a current limiting circuit for preventing excessive current from flowing between the first and second voltage sources; and wherein the current limiting circuit comprises a current detecting circuit for detecting current flowing between the first and second voltage sources and for providing an overcurrent signal to the pulse width modulator to reduce a duty cycle of the first and second control signals.

10. The converter defined in claim 9, wherein the current detecting circuit comprises a comparator connected to a current sensor coupled in a circuit coupling the first and second voltage sources, the comparator providing the overcurrent signal if the current in the current sensor exceeds a predetermined reference.

11. The converter defined in claim 10, wherein the current sensor is connected in series with an inductor coupled with the transformer, so that the current flowing between the first and second voltage sources is smoothed when the pulse width modulator reduces the duty cycle.

12. The converter defined in claim 11, wherein the current limiting circuit further includes a transistor coupled between an output of the comparator and an input of the pulse width modulator for transmitting the overcurrent signal.

13. The converter defined in claim 12, further comprising a plurality of drivers, the drivers being arranged in four pairs each having two series connected drivers so that each pair of the series connected drivers is coupled between an output of the pulse width modulator and a respective controlled switch.

14. The converter defined in claim 1, wherein a selected one of two of the plurality of windings is connected so that it will not pass current between the first and second voltage sources at a specified time in a cycle of the controller.

15. The converter defined in claim 14, further comprising a capacitor coupled between a common ground for the two voltage sources and a point coupled to the two of the plurality of windings and a pair of diodes each coupling the point and a respective one of the two of the plurality of windings for providing a negative voltage supply.

16. The converter defied in claim 1, wherein either of the voltage sources includes an automotive alternator providing a rectified direct current, whereby the alternator can provide current to both of the voltage sources, with current to one of the voltage sources being supplied through the converter.

17. The converter defined in claim 1, wherein each switch comprises a parallel combination of a bidirectional switch and a diode.

18. A DC-to-DC converter comprising:

a transformer having a first pair of windings on opposite sides of a central tap and a second pair of windings each connected to an outer terminal of a winding of the first pair;

a first pair of alternately operable electronic switches each connected between an outer terminal of the first pair of windings and one pole of a first direct current voltage source, the first direct current voltage source having another pole connected to a ground connection;

a second pair of alternately operable electronic switches each connected between an outer terminal of the second pair of windings and one pole of a second direct current voltage source, the second direct current voltage source having another pole connected to the ground connection; and respective drivers for the electronic switches and a controller for the drivers to turn on one switch of the first pair and turn on one switch of the second pair simultaneously and alternately turn on a second switch of the first pair and turn on a second switch of the second pair simultaneously, thereby allowing pulsed direct current to flow between the two voltage sources in dependence on load demands imposed on the two voltage sources.

* * * * *